United States Patent [19]

Akao

[11] Patent Number: 4,469,741

[45] Date of Patent: * Sep. 4, 1984

[54] LAMINATED SHEETS

[75] Inventor: Mutsuo Akao, Kanagawa, Japan

[73] Assignee: Fuji Photo Film Co., Ltd., Kanagawa, Japan

[*] Notice: The portion of the term of this patent subsequent to May 25, 1999 has been disclaimed.

[21] Appl. No.: 318,178

[22] Filed: Nov. 4, 1981

[30] Foreign Application Priority Data

Nov. 4, 1980 [JP] Japan ................................ 55-155491

[51] Int. Cl.³ ........................ B32B 7/02; B32B 27/40; B32B 27/08
[52] U.S. Cl. ................................. 428/214; 428/424.8; 428/515; 428/910; 428/518; 428/213; 428/516; 428/138; 428/304.4; 428/317.1; 428/319.7
[58] Field of Search ............ 428/215, 218, 214, 424.8, 428/515, 518, 910, 424.2, 317.1, 317.7, 304.4, 213, 424.6, 423.5, 423.7, 511

[56] References Cited

U.S. PATENT DOCUMENTS

| | | | |
|---|---|---|---|
| 4,147,291 | 4/1979 | Akao et al. | 428/218 |
| 4,331,725 | 5/1982 | Akao | 428/910 |
| 4,359,499 | 11/1982 | Akao et al. | 428/511 |

FOREIGN PATENT DOCUMENTS 1175528 12/1979 United Kingdom ............ 428/317.7

Primary Examiner—George F. Lesmes
Assistant Examiner—Beverly Johnson
Attorney, Agent, or Firm—Sughrue, Mion, Zinn, Macpeak & Seas

[57] ABSTRACT

A laminated sheet is described, which comprises a porous sheet, and a uniaxially molecularly-orientated thermoplastic resin film bonded onto at least one side of the porous sheet through an adhesive layer. This laminated sheet has excellent physical strength and cushioning characteristics. Incorporation of a light-shielding substance into the laminated sheet makes it suitable for use as a wrapping material for light-sensitive materials.

10 Claims, 9 Drawing Figures

LAMINATED SHEETS

FIELD OF THE INVENTION

The present invention relates to laminated sheets having excellent physical strength and cushioning characteristics which are to be used as wrapping materials or construction materials.

BACKGROUND OF THE INVENTION

In general, laminated sheets to be used as wrapping materials are required to have various characteristics depending on the type, shape, weight and so forth of an article to be wrapped. In particular, a wrapping material for use in the preparation of a bag is required to have sufficient physical strength, e.g., tear strength, tensile strength, burst strength, and impact strength, and if necessary, good cushioning characteristics.

Laminated sheets for use as construction materials, particularly floor materials and wall materials must have good cushioning characteristics, surface strength, and printing suitability, and furthermore, be inexpensive.

Such laminated sheets, particularly those for use as wrapping materials have heretofore been known as described in U.S. Pat. Nos. 4,147,291 and 4,258,848. These laminated sheets have a fundamental layer construction as illustrated in FIG. 1, in which two uniaxially drawn high density polyethylene films 1 and 2 are disposed in such a manner that the drawing axes of the two films form an angle of 45° and 90°, and are bonded together through an adhesive layer 3. The adhesive layer 3 is usually made of low density polyethylene. In some cases, however, in place of the provision of the adhesive layer 3, the films 1 and 2 may be heat-sealed at a suitable temperature, e.g., about 180° C.

These laminated sheets have high strength in any of longitudinal, lateral and oblique directions because the drawing directions of the films cross with each other. They are, therefore, greatly improved in the foregoing physical strength, at least, compared with the conventional composite laminated sheets, for example, they are stronger than those sheets composed of a low density polyethylene film, and paper, an aluminum foil or the like.

It has been revealed, however, that the physical strength of the laminated sheet varies depending on the thickness of the adhesive layer 3, i.e., as the thickness is increased, the physical strength is reduced and the cushioning characteristics are deteriorated. The reason for this is believed that when the films 1 and 2 are bonded together with the adhesive layer 3 having a thickness exceeding a certain critical level, they are united completely as one body, and act as substantially one film even though the two films are adhered in such a manner that the drawing axes of the two films intersect at a certain angle. It is, therefore, necessary to reduce the thickness of the adhesive layer 3 to as low a level as possible. However, when the thickness of the adhesive layer 3 is reduced excessively, problems such as formation of film cutting and stripping-apart of the films 1 and 2 due to a reduction of adhesion force therebetween arise.

The method of heat-sealing the films 1 and 2 is also not desirable in that heat shrinkage of the film is caused at areas where heating is applied, resulting in the formation of wrinkles which is not desirable from a viewpoint of quality.

SUMMARY OF THE INVENTION

The principal object of the present invention is to overcome the above-described defects of the conventional laminated sheets, and to provide a novel laminated sheet having excellent physical strength and cushioning characteristics.

The present invention, therefore, provides a laminated sheet comprising a porous sheet and a uniaxially molecularly-orientated thermoplastic resin film bonded onto at least one surface of the porous sheet through an adhesive layer. The term "porous sheet" as used herein indicates a flexible band-like material containing voids in the planar and sectional directions thereof, such as a foamed sheet and a fabric.

DETAILED DESCRIPTION OF THE INVENTION

The laminated sheet of the present invention is explained in detail with reference to the accompanying drawings.

Figure 2:
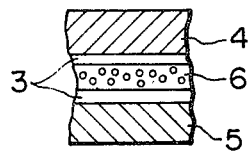
FIG. 2 is a cross-sectional view of a preferred embodiment of the laminated sheet of the present invention.

Referring to FIG. 2 showing a cross-sectional view of the most preferred embodiment of the present invention, the laminated sheet comprises a porous sheet 6 and uniaxially molecularly-orientated thermoplastic resin films 4 and 5 bonded onto each side of the porous sheet 6 through an adhesive layer 3.

Examples of useful uniaxially molecularly-orientated thermoplastic resin films 4 and 5 include films made of thermoplastic resins which can be uniaxially molecularly-orientated, such as uniaxially molecularly-orientated thermoplastic resin films. In view of availability, general purpose properties, production suitability and cost, those films made of polyethylene, polypropylene, polystyrene, polyvinylidene chloride, polycarbonate, polyethylene terephthalate, polyvinyl chloride compounds, polyamide, and the like, all having various densities, are preferred. In particular, those films made of polyolefin resins having various densities, such as polyethylene, polypropylene, polybutene, and ethylene copolymers, are preferred. Of these films, a uniaxially drawn high density polyethylene film having a density of 0.94 g/cm$^3$ or more is more preferred, and a uniaxially drawn high density polyethylene film having a density of 0.96 g/cm$^3$ is particularly preferred. The direction in which the thermoplastic resin film is molecularly-orientated may include any of longitudinal, lateral and oblique directions. In any case, however, when the resin films 4 and 5 are bonded together, it is necessary to dispose them in such a manner that the molecularly-orientated directions cross with each other at an angle of 45° to 90°. The thickness of the uniaxially molecularly-orientated thermoplastic resin film is preferably about 15 to 100 microns, and particularly preferably about 20 to 70 microns.

Materials which can be used in the preparation of the adhesive layer 3 include thermoplastic resins such as low density polyethylene, polypropylene, an ethylene-vinyl acetate copolymer resin, ionomers, and an ethylene-ethyl acrylate copolymer resin. In addition, known hot melt-type adhesives, such as ethylene-vinyl acetate copolymer-, low molecular weight polyethylene-, and polyamide-based adhesives, and general adhesives can be used.

If necessary, a suitable foaming agent, such as an inorganic foaming agent, e.g., sodium hydrogencarbonate, and an organic foaming agent, e.g., diazoaminobenzene, or water may be added to a material to be used for the preparation of the adhesive layer, and extruded with a suitable coating apparatus, e.g., by extrusion coating to thereby produce an adhesive layer containing a plurality of netlike voids in the planar direction. For example, when a low density polyethylene resin is used as the material for the preparation of the adhesive layer, there can be employed a method in which water is added to the material in an amount of 0.1 to 10% by weight based on the weight of the material before melting of the material. The resulting mixture is extrusion-coated by the known T die process. Also, the adhesive layer may be extruded through the T die in the form of streak. Such formation of voids in the adhesive layer prevents the uniaxially molecularly-orientated thermoplastic resin films 4 and 5 from coming into close contact with the porous sheet 6 as described hereinafter in detail, at least, at areas where the voids are formed. At these areas, therefore, the cross effect of each film is produced making it possible to obtain sufficient physical strength. In addition, the formation of such voids produces the advantage that the production cost is reduced compared with the conventional adhesive layer containing no voids since the material for adhesion can be reduced in an amount corresponding to the volume of the voids.

With regard to the thickness of the adhesive layer 3 of the present invention, it is sufficient to consider only to the minimum thickness. An increase in the thickness of the adhesive layer 3 merely results in increasing production cost and stiffness of the ultimate laminated sheet. The thickness of the adhesive layer 3 is preferably about 7 to 50 microns, and particularly preferably about 10 to 30 microns.

In brief, as long as the minimum thickness (usually about 7 microns) is obtained which makes it possible to bond together the uniaxially molecularly-orientated thermoplastic resin films 4 and 5, and the porous sheet 6, the thickness of the adhesive layer can be adjusted to a suitable level above the minimum thickness. This leads to easy production of the adhesive layer.

A foamed sheet is usually used as the porous sheet 6 due to its production suitability, production cost, and so forth. Materials which can be used for the preparation of the porous sheet 6 include styrene-, olefin-, vinylchloride-, and polyurethane-based resins. In addition, all resins which can be extrusion-foamed can be used. There are no special limitations to the foaming agent for use in the preparation of the porous sheet 6. Known foaming agents for use in the extrusion foaming method can be used.

Examples of combinations of foaming agents and resins are shown below.

In the case of a polystyrene resin, low boiling point foaming agents, e.g., propane, butane, pentane, propylene, methyl chloride, and dichlorodifluoromethane are used. In the case of a polyethylene resin, thermal decomposable foaming agents, e.g., dichlorodifluoromethane, azodicarbonamide, dichlorotetrafluoroethane, and isobutane are used. In the case of a polyurethane resin, foaming agents, e.g., trichlorofluoromethane and dichlorodifluoromethane are used.

In addition to the above-described foamed sheet, paper, cloth, unwoven fabric, cross yarn, cross laminated airy fabric, and the like can be suitably selected and used as the porous sheet 6. Providing the porous sheet 6 makes it possible to include cushioning characteristics in the laminated sheet.

The thickness of the porous sheet 6 composed of various resins is preferably about 1 to 50 mm, and particularly preferably about 5 to 10 mm in the case of being used as construction material or product-protecting box, and it is preferably about 0.2 to 10 mm and particularly preferably about 0.7 to 6 mm in the case of being used as bag-producing material or wrapping materials. The expansion ratio of the porous sheet 6 composed of various resins is preferably about 1.5 to 110 times, and particularly preferably about 10 to 60 times. The thickness of the porous sheet 6 composed of paper, cloth, unwoven fabric, cross yarn or cross laminated airy fabric is preferably about 0.04 to 1 mm, and particularly preferably about 0.07 to 0.5 mm.

The following examples are given to illustrate the present invention in greater detail.

EXAMPLE 1

Figure 1:
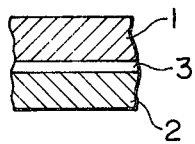
FIG. 1 is a cross-sectional view showing the layer construction of the conventional laminated sheet.

A conventional laminated sheet having the layer constraction illustrated in FIG. 1 was compared with the laminated sheet of the present invention having the layer construction illustrated in FIG. 2 with respect to physical strength.

The conventional laminated sheet was prepared as follows:

Two 45 micron thich uniaxially drawn high density polyethylene films were disposed so that the drawing axes of the films formed an angle of 90°. The films were bonded together by extrusion-coating an adhesive layer composed of low density polyethylene in a thickness of 20 microns. The total thickness of the conventional laminated sheet was 110 microns.

The laminated sheet of the present invention was prepared as follows:

The same two uniaxially drawn high density polyethylene films as used in the preparation of the conventional laminated sheet were bonded onto both sides of a 1 mm thick polyethylene foamed sheet (expansion ratio 50 times) through a 20 micron thick extrusion-coated adhesive layer composed of low density polyethylene. The films were bonded so that the drawing axes of the films crossed with each other at an angle of 90° as in the case of the conventional laminated sheet. The total thickness of the laminated sheet was 250 microns.

The physical strength and cushioning characteristics of each of the above prepared two laminated sheets were measured by the following testing methods. The results are shown in the Table 1.

Tear Strength: According to JIS P-8116-1976.

Abrasion Resistance: Each of the two laminated sheets was formed into a bag. This bag was charged with an article having a weight of about 5 kg, and sealed. Thereafter, a vibration test according to JIS Level II was performed, and the extent of damage of the surface of the laminated sheet was examined.

Extent of Impact Perforation: According to JIS 8134.

Drop Strength: Each of the two laminated sheet was formed into a bag. This bag was charged with an article having a weight of about 5 kg and sealed. Thereafter the bag was dropped from a height of 1 meter. The dropping was repeated until the bag was perforated.

TABLE 1

|  | Conventional Laminated Sheet | Laminated Sheet of the Present Invention |
| --- | --- | --- |
| Tear Strength |  |  |
| (Longitudinal Direction) | B* (600 g) | A** (1,320 g) |
| (Lateral Direction) | B (1,050 g) | A (1,870 g) |
| Impact Perforation Strength | B (4.8 kg · cm) | A (10.8 kg · cm) |
| Abrasion Resistance | B | A |
| Drop Strength | B (3)*** | A (9) |

The evaluations are hereafter as follows.
*B: Good for practical use
**A: Excellent for practical use
***: The value in the parenthesis indicates the number of the dropping test repeated until the bag is perforated.

EXAMPLE 2

Figure 4:
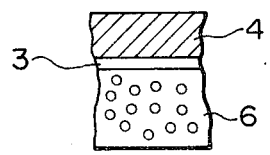

A conventional laminated sheet having the layer construction illustrated in FIG. 1 was compared with the laminated sheet of the present invention having the layer construction illustrated in FIG. 4 with respect to physical strength.

The conventional laminated sheet was prepared as follows:

Two 45 microns thick uniaxially drawn high density polyethylene films were disposed so that the drawing axes of the films formed an angle of 90°. The films were bonded together by extrusion-coating an adhesive layer composed of low density polyethylene in a thickness of 20 microns. The total thickness of the conventional laminated sheet was 110 microns.

The laminated sheet of the present invention was prepared as follows:

The same 45 micron thick uniaxially drawn high density polyethylene film as used in the preparation of the conventional laminated sheet was bonded onto one side of a 1 mm thick polyethylene foamed sheet (expansion ratio 30 times; substantial thickness 33 microns) through a 20 micron thick extrusion-coated adhesive layer composed of low density polyethylene. The total thickness of the laminated sheet was 700 microns (substantial thickness 98 microns).

The physical strength and cushioning characteristics of each of the above prepared two laminated sheets were measured by the same testing methods as used in Example 1 and furthermore by the following test methods. The results are shown in the Table 2.

Flexibility: According to JIS P-8125-1976.

Gelbo Test Strength: According to MIL B 131. A test machine basically comprises a stationary disc (A) and a rotatable disc (B) both of which have a diameter of 87 mm and a thickness of 13 mm. The disc (A) and (B) are placed facing each other separated by a distance of 174 mm. After a sample film is cylindrically wound on both discs (A) and (B) and then fixed thereto, the disc (B) is first forwarded towards the disc (A) by a distance of 89 mm from its original position, and during forwarding, the disc (B) is simultaneously rotated 440 degree. Then, the disc (B) is further forwarded by a distance of 64 mm without rotating. Thereafter, the disc (B) is returned to its original position by an inverse sequence of steps to those described above. One return trip of the disc (A) refers to one bending operation of the sample film. The strength is evaluated from the number of times of the bending operation until first pinhole occurs, where the bending operation is applied in a speed of 40 times a minute.

TABLE 2

|  | Conventional Laminated Sheet | Laminated Sheet of the Present Invention |
| --- | --- | --- |
| Impact Perforation Strength | B (4.8 kg · cm) | A (10.1 kg · cm) |
| Abrasion Resistance | B | A |
| Gelbo Test Strength | B (5) | A (50 or more) |
| Flexibility (Lateral Direction) | B (2.0 g) | A (0.8 g) |

As apparent from the Tables 1 and 2, the physical strength of the laminated sheets of the present invention is greater than that of the conventional wrapping materials. Furthermore, the data of the drop strength test indicate that the laminated sheets of the present invention are superior also in respect of cushioning characteristics to the conventional wrapping materials.

Although the present invention has been explained with reference to two embodiments, it is not limited to those embodiments and the following modifications can be made.

Figure 3:
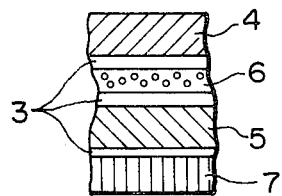
FIGS. 3 to 9 are each a cross-sectional view of a modified example of the laminated sheet of the present invention.

FIG. 3 is a cross-sectional view of a laminated sheet prepared by bonding a flexible sheet 7 (e.g., a plastic film, cellophane, an aluminum foil, paper, cloth, and unwoven fabric) onto the laminated sheet of FIG. 2 through an adhesive layer 3.

FIG. 4 is a cross-sectional view of a laminated sheet prepared by bonding a uniaxially molecularly-orientated thermoplastic resin film 4 onto one side of a porous sheet 6 through an adhesive layer 3.

Figure 5:
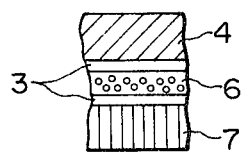

FIG. 5 is a cross-sectional view of a laminated sheet prepared by bonding a flexible sheet 7 onto the laminated sheet of FIG. 4 through an adhesive layer 3.

Figure 6:
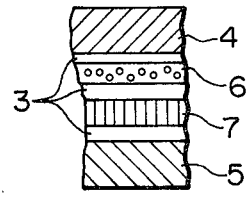

FIG. 6 is a cross-sectional view of a laminated sheet prepared by interposing between the uniaxially molecularly-orientated thermoplastic resin film 5 and the porous sheet 6 of the laminated sheet of FIG. 2 through an adhesive layer 3.

Figure 7:
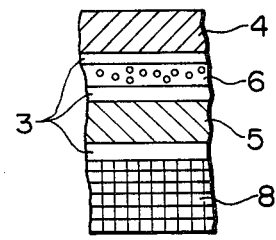

FIG. 7 is a cross-sectional view of a laminated sheet prepared by bonding the laminated sheet of FIG. 2 onto a plate 8 (e.g., a plywood plate, a wood plate, a plastic plate, corrugated board, and card board) through an adhesive layer 3, which is suitable for use as a floor material or wall material, or a wrapping material having good cushioning characteristics.

Figure 8:
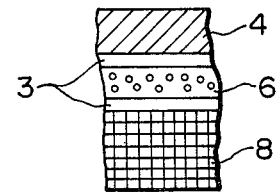

FIG. 8 is a cross-sectional view of a laminated sheet prepared by bonding the laminated sheet of FIG. 4 onto a plate 8 through an adhesive 3, which has the same applications as described for the laminated sheet of FIG. 7.

Figure 9:
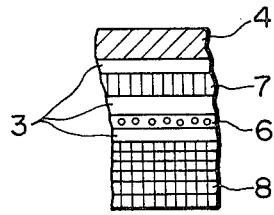

FIG. 9 is a cross-sectional view of a laminated sheet prepared by interposing a flexible sheet 7 in the laminated sheet of FIG. 8.

These laminated sheets are modifications of the laminated sheet of the present invention. It is to be noted, however, that the present invention is not limited thereto.

Each of the layers 3 to 8 may contain various additives such as light-shielding substances, e.g., carbon black, aluminum powder, aluminum paste, TiO, calcium carbonate, clay, and dye, and antistatic agents, e.g., surface active agents, depending on the application in which the laminated sheet is used. These additives can be appropriately selected depending on the purpose for which the laminated sheet is used.

In particular, a laminated sheet having a uniaxially molecularly-orientated thermoplastic resin film with a light-shielding substance added thereto is superior with respect to physical strength, thermal insulation, and protection of an article. For example, incorporation of such light-shielding substances into wrapping materials of light-sensitive materials produces an excellent effect that could not be obtained by the conventional wrapping materials.

As described above in detail, the laminated sheet of the present invention has sufficient physical strength and cushioning characteristics. Thus, it is greatly useful for practical use as a bag-producing material, a wrapping material, a construction material, or a product-protecting box.

While the invention has been described in detail and with reference to specific embodiment thereof, it will be apparent to one skilled in the art that various changes and modifications can be made therein without departing from the spirit and scope thereof.

What is claimed is:

1. A laminated sheet, comprising:
    a first uniaxially molecularly-orientated thermoplastic resin film orientated in a first direction;
    a first adhesive layer bonded to said first film;
    a porous sheet bonded to said first adhesive layer;
    a second adhesive layer bonded to said porous sheet; and
    a second uniaxially molecularly-orientated thermoplastic resin film bonded to said second adhesive layer in such a manner that its molecularly-orientated direction crosses said first direction of said first film at an angle of 45° to 90°,
    wherein said first and second adhesive layers have a thickness of 7 microns or more.

2. A laminated sheet as claimed in claim 1, wherein said uniaxially molecularly-orientated thermoplastic resin films are comprised of high-density polyethylene having a density of 0.94 g/cm$^3$ or more.

3. A laminated sheet as claimed in claim 1, wherein said porous sheet is comprised of a material selected from the group consisting of styrene, olefin, vinyl chloride, and polyurethane-based resins.

4. A laminated sheet as claimed in claim 3, wherein said material of said porous sheet includes a foaming agent.

5. A laminated sheet as claimed in claim 1, further comprising:
    a third adhesive layer bonded to said first uniaxially molecularly-orientated thermoplastic resin film; and
    a flexible sheet bonded to said third adhesive layer.

6. A laminated sheet as claimed in claim 5, wherein said flexible sheet is a material selected from the group consisting of plastic film, cellophane, aluminum foil, paper, cloth or an unwoven fabric.

7. A flexible laminated sheet, comprising:
    a first uniaxially molecularly-orientated thermoplastic resin film from 15 μm to 100 μm thick orientated in a first direction;
    a first adhesive layer from 7 μm to 50 μm thick bonded to said first film;
    a porous sheet of from 0.2 mm to 10 mm thick bonded to said first adhesive layer;
    a second adhesive layer from 7 μm to 50 μm thick bonded to said porous sheet; and
    a second uniaxially molecularly-orientated thermoplastic film from 15 μm to 100 μm thick bonded to said second adhesive layer in such a manner that its molecularly-orientated direction crosses said first direction of said first film at an angle of 45° to 90°.

8. A flexible laminated sheet, comprising:
    a first uniaxially molecularly-orientated thermoplastic resin film from 20 μm to 70 μm thick orientated in a first direction;
    a first adhesive layer from 10 μm to 30 μm thick bonded to said first film;
    a porous sheet from 0.7 mm to 6 mm thick bonded to said first adhesive layer;
    a second adhesive layer from 10 μm to 30 μm thick bonded to said porous sheet; and
    a second uniaxially molecularly-orientated thermoplastic film from 20 μm to 70 μm thick bonded to said second adhesive layer in such a manner that its molecularly-orientated direction crosses said first direction of said first film at an angle of 45° to 90°.

9. A flexible laminated sheet as in claim 7, wherein at least one of the uniaxially molecular-orientated thermoplastic resin film, porous sheet and adhesive layer contains a light-shielding substance.

10. A flexible laminated sheet as in claim 8, wherein at least one of the uniaxially molecular-orientated thermoplastic resin film, porous sheet and adhesive layer contains a light-shielding substance.

* * * * *